United States Patent [19]

Ogawa

[11] 4,350,390

[45] Sep. 21, 1982

[54] SEAT

[75] Inventor: Hiroshi Ogawa, Iwakuni, Japan

[73] Assignee: Mitsui Petrochemical Industries, Ltd., Tokyo, Japan

[21] Appl. No.: 147,049

[22] Filed: May 6, 1980

[30] Foreign Application Priority Data

May 11, 1979 [JP] Japan .................................. 54-56906

[51] Int. Cl.³ .............................................. A47G 7/16
[52] U.S. Cl. ................................................. 297/452
[58] Field of Search .................. 297/DIG. 1, DIG. 2, 297/452; 428/420

[56] References Cited

U.S. PATENT DOCUMENTS

| 2,318,184 | 5/1943 | Rojas | 428/420 |
| 2,491,784 | 12/1949 | Thompson | 297/460 |
| 2,975,488 | 3/1961 | Brauner | 297/DIG. 2 |
| 3,323,151 | 6/1967 | Lerman | 297/452 |
| 3,408,106 | 10/1968 | Bolling et al. | 297/452 |
| 3,695,507 | 10/1972 | Sams | 229/53 |

Primary Examiner—Doris L. Troutman
Attorney, Agent, or Firm—Wyatt, Gerber, Shoup, Scobey & Badie

[57] ABSTRACT

A seat is made by using a frame fabricated by cold drawing of laminates composed of an inner layer of a non-metallic material sandwiched between two metal foil outer layers.

7 Claims, 11 Drawing Figures

SEAT

BACKGROUND OF THE INVENTION

1. Field of the Invention

The present invention relates to a seat and more particularly, to a light seat suitable for vehicles such as motor cars, railroad carriages, airplanes and the like.

2. Description of the Prior Art

Heretofore, car seats have been made by covering a frame obtained by processing steel plates with a cushion. It has been contemplated to decrease the weight of car seats from the viewpoint of saving energy, for example, the steel frame of the seats is replaced by a frame made of plastics. However, plastics seats are poor in points of fire resistance and mechanical strength. Fiber reinforced plastics (FRP) such as glass fiber reinforced plastics, carbon fiber reinforced plastics and the like, have low impact strength at low temperatures and therefore, the car seats having a frame of FRP can not be used in a cold district. FRP frames are not utilized extensively to decrease the weight of car seats.

Further, production of FRP may be injurious to human health because it includes evaporation of organic solvents.

In addition, FRP is expensive.

SUMMARY OF THE INVENTION

An object of the present invention is to provide a seat free from the above mentioned drawbacks.

Another object of the present invention is to provide a seat whose frame can be easily fabricated by cold working such as bending, drawing and the like.

A further object of the present invention is to provide a light out strong seat.

According to the present invention, there is provided a seat which comprises a frame shaped by cold drawing of a laminate composed of an inner layer of a non-metallic material and two metal foil outer layers sandwiching the inner layer in between them.

DESCRIPTION OF THE PREFERRED EMBODIMENTS

Figure 1:
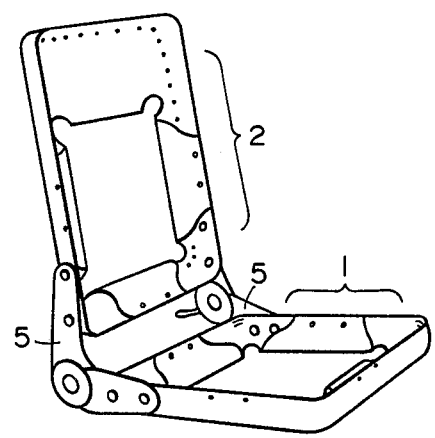
FIG. 1 is an oblique view of an embodiment of the frame of seat according to the present invention.

As the non-metallic material, there may be mentioned paper honey-comb, glass wool, these materials impregnated with a synthetic resin, and foamed thermosetting resins such as foamed phenolic resions, formed urethane resins and the like. And further there are preferably mentioned thermoplastic resins such as polyolefins, polystyrenes and the like because the resulting laminate exhibits an excellent cold working property upon cutting to form various forms, boring, bending, drawing and the like. As the polyolefins, there may be mentioned homopolymers and copolymers of $\alpha$-olefins such as ethylene, propylene, 1-butene, 4-methyl-1-pentene and the like. More particularly there are exemplified middle or low density polyethylene, ethylene-vinyl acetate copolymers, high density polyethylene, and propropylene. These polymers may be used alone or in combination. The polyolefins may be used in combination with synthetic rubbers such as polybutadiene, polyisobutylene, chloroprene rubber, EPR (ethylene-propylene rubber), EPT (ethylene-propylene terpolymer), and the like, or other soft resins. These polyolefins are preferably graft-copolymerized partly or wholly with an unsaturated carboxylic acid such as acrylic acid and the like, or anhydride thereof such as maleic anhydride and the like so as to enhance the adhesivity to the metal foil.

Where a thermoplastic resin is used for the inner layer, if desired, there are used various known stabilizers such as magnesium hydride, aluminum hydride, silica, hydrotalcite, talc, clay, barium sulfate, gypsum, glass fiber, wood powder, synthetic wood fiber, titania, calcium carbonate, carbon black, mica, petroleum resins, phenolic resins, rosin and the like.

The inner layer may be in a form of non-woven cloth, mat or formed material. For exaple, filament of thermoplastic resin or a thermally fused mat composed of said filament mixed with pulp or the like can be used as an inner layer.

It is preferable to incorporate one or more of known fire-retardants, flame-retardants and inorganic filler so as to impart fire resistance and improve the adhesivity with the outer layer.

The metal foils includes foil of a metals such as iron, copper, zinc, tin, aluminum and the like, or an alloy thereof such as stainless steel and the like. Among them, a foil of aluminum or iron, or a foil of an alloy composed of such metal is recommended because these foils have good workability.

When a thermoplastic resin is used as an inner layer material, it is preferable to integrate it with the outer layers composed of a metal foil by thermal press. In order to integrate these layers, there may be used various methods such as surface treating, coating an adhesive, insertion of an adhesive film, and the like. It is preferable for strengthening the adhesion between the inner layer and the outer layer and conducting cold working that the above mentioned material containing a thermoplastic resin such as unsaturated carboxylic acid modified copolymers and the like is used as an ahesive or adhesive film.

As polyolefins as used for adhesive film, there may be mentioned polymers having degree of crystallization of at least 25% when measured by x-ray, for example, homopolymers of $\alpha$-olefins such as ethylene, propylene, 1-butene, 1-pentene 3-methyl-1-butene, 1-hexene, 4-methyl-1-pentene and the like, copolymers of one of the above mentioned $\alpha$-olefins with less then 10 mole %, preferably less than 7 mole % of other $\alpha$-olefin, or mixtures thereof. Further there may be mentioned copolymers of the above mentioned $\alpha$-olefin with acyloxy, particularly, acetoxy substituted one such as vinyl acetate, or their saponified ones.

Among them, middle or low density polyethylene, polypropylene, in particular, polyethylene having density of 0.910–0.970 g./cc. and melt index (190° C.) of 0.05–100, are preferable.

Modified polyolefins used as an adhesive film may be produced by grafting unsaturated carboxylic acid or its derivative to a part or the whole of the above mentioned polyolefins.

As the unsaturated carboxylic acid, there may be mentioned acrylic acid, methacrylic acid, fumaric acid, maleic acid, itaconic acid, citraconic acid and the like.

As the derivatives of unsaturated acids, there may be mentioned acid anhydrides, esters, amides, imides, metal salts and the like. For example, there are maleic anhydride, citaconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, diethyl itaconate, acrylamide, methacrylamide, maleic acid monoamide, maleic acid diamide, maleic acid N-monoethylamide, maleic acid N,N-diethylamide, maleic and N-monobutylamide, maleic acid N,N-dibutylamide, fumaric acid monoamide, fumaric acid diamide, fumaric acid N-monoethylamide, fumaric acid N,N-diethylamide, fumaric acid N-monobutylamide, fumaric acid N,N-dibutylamide, maleimide, N-butylmaleimide, N-phenylmaleimide, sodium acrylate, sodium methacrylate, potassium acrylate, potassium metacrylate and the like.

Among them, maleic anhydride is particularly preferable.

There are various known methods for grafting the above mentioned monomer to polyolefins. For example, a polyolefin and a monomer for grafting are reacted at elevated temperatures in the presence or absence of a solvent with or without an added radical initiator. Other vinyl monomers such as styrene may be added to the reaction system.

The amount of monomer grafted to a polyolefin (hereinafter called "degree of grafting") is preferably $10^{-4}$–3% by weight.

A part or the whole of the polyolefin may be grafted. However, from industrial production point of view, it is desirable that a modified polyolefin of degree of grafting of $10^{-2}$–6% by weight is preliminarily prepared and then mixed with non-modified polyolefin because the concentration of the grafting monomer in the composition can be appropriately adjusted by such procedure.

As hydrocarbon elastomers, one component of the adhesive film, there may be mentioned polyisobutylene, ethylene-propylene rubber, ethylene-1-butene rubber, butyl rubber, butadiene rubber, styrene-butadiene rubber, ethylene-butadiene rubber, isoprene rubber and the like.

Among them, ethylene-propylene rubber and polyisobutylene are particularly preferable.

To the adhesive film there may be added heat resistant stabilizer, weather resistant stabilizer, lubricant, antistatic agent, nucleating agent, pigment, dyestuff, fire retardant, blocking inhibitor, slipping agent and the like in an amount usually used.

The adhesive film is composed of 70-99 parts by weight, preferably 80-97 parts by weight of a modified polyolefin and 1-30 parts by weight, preferably 3-20 parts by weight of a hydrocarbon elastomer (totally 100 parts by weight). When the hydrocarbon elastomer is less than 1 part by weight, the adhesion strength is not improved. When it is more than 30 parts by weight, film shapeability of the adhesive film is not good.

The adhesive film is usually prepared in a form of film having thickness of 10-100 microns by T-die shaping or inflation shaping. Thick adhesive sheet may be used, but it is not preferably from economical point of view.

A laminate composed of an inner layer of a thermoplastic resin and outer layers of a metal foil containing mainly aluminum or iron has a good cold workability and therefor, such laminate can be easily subjected to bending or drawing working and the function is improved.

The frame used in the present invention is usually composed of one sheet of laminate, but, if desired, may be composed of two or more of the laminates which are connected each other, or superposed. Or laminates may be partly superposed or superposed with a space from each other. Further, the laminate may be subjected to a secondary working such as corrugating, embossing, and the like.

When seats are produced by using an iron frame such as steel plate frame, the seats are so stong that a driver of a car having such seats is subjected to a large impact when the car collides. On the contrary, according to the present invention, upon such collision the impact against a man is very low and the main may not injured too extensively since the impact caused by collision is absorbed by the inner layer material.

According to the present invention, a conventional machine for seat production can be used as it is. According to the present invention, cold working is employed, and conventional seat manufacturers (using iron frames) have usually only cold working machines.

When hot working is employed, the inner layer material such as polymers is often heated to temperatures over the melting point. This results in deterioration of the inner material, lowering of the quality and consumption of much heat energy. However, according to the present invention, such hot working is not employed, but cold working can be employed. Therefore, the above mentioned drawbacks do not occur. The temperature of cold working is preferably 5°–50° C. When the temperature is too low, cracks tend to form on the surface of the metal layer.

The present invention is further explained in detail below.

Referring to FIG. 1, there is shown a frame of seat according to the present invention. Seat plate 1 and backrest 2 are connected by a tilting angle controlling device 5. If desired, the frame is provided with metal fittings for fixing a head restraint, a device for sliding the seat and the like. On the frame are mounted springs, cushion material such as polyurethane foam, polyvinyl chloride foam (the foams are communicated with each other). Members for shaping the outer form of the seat and finally a surface layer such as polyvinyl chloride leatherette, fiber cloth and the like. In place of the springs, there are recently used foamed materials having independent foams such as highly foamed polyethylene and the like.

Figure 2:
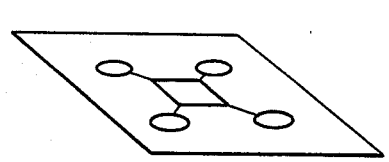
FIG. 2–FIG. 5 are oblique views for explaining a process for producing a seat of the present invention.
Figure 3:
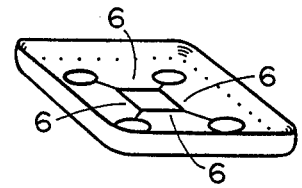
Figure 4:
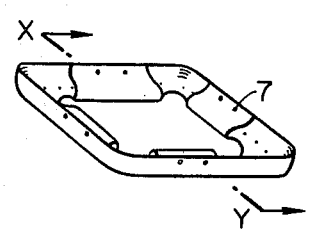

Referring to FIGS. 2–5, a process for producing a seat by shaping frames corresponding to a seat plate and a backrest according to a cold working. Five holes are formed in a rectangular laminate. A portion of the laminate corresponding to shortest distance between each outer hole and the center hole is cut. As shown in FIG. 2, the center hole is preferably rectangular. The resulting laminate is subjected to drawing to raise ribs along the periphery by using a press or the like as shown in FIG. 3. The inner four pieces, i.e. reinforcing members 6, are bent by bending working and bonded to the peripheral ribs with rib rivets 7 or by spot welding (FIG.

Figure 5:
Figure 6:
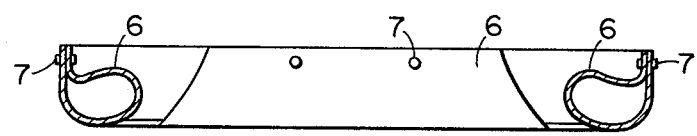
FIG. 6 is a cross sectional view taken along a line X-Y of FIG. 4.

4) to form a frame. FIG. 6 is a cross section along X-Y of FIG. 4. The frame is effectively reinforced by reinforcing portions 6. The reinforcing portions 6 can be easily formed by bending a part of the laminate. On the resulting frame there are disposed springs, a cushion material and the like according to a conventional method to produce a seat as shown in FIG. 5. A seat may be that having both a backrest and a seat portion as shown in FIG. 1 or that having only a seat portion as shown in FIG. 5.

Figure 9:
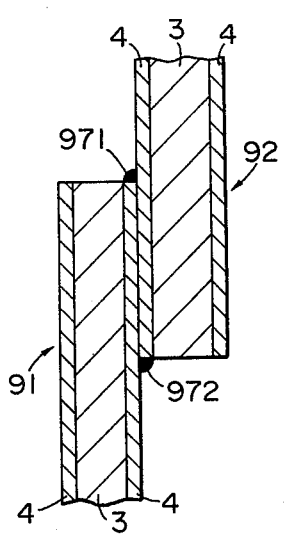
FIG. 9–FIG. 11 show examples of spot-welding the laminates used for the frame of seat according to the present invention.
Figure 10:
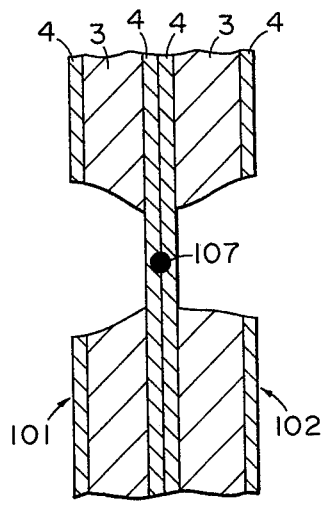
Figure 11:
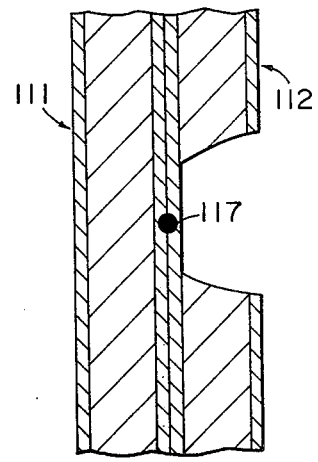

Some embodiments of spot welding are shown in FIGS. 9-11. In FIG. 9, two laminates 91 and 92 each of which is composed of an inner layer 3 and outer layers 4 and 4 are bonded at the end portions 971 and 972 of the laminates by spot welding. In FIG. 10, two laminates 101 and 102 each of which has a portion where a part of outer layer 4 and a part of inner layer 3 are removed are bonded at a portion 107 where the outer layer and inner layer are removed, by spot welding. In FIG. 9, a further embodiment of spot welded laminates 111 and 112. These laminates are bonded at a portion 117. A part of outer layer and a part of inner layer of laminate 112 only are removed, and spot welding is effected at the removed portion.

Figure 7:
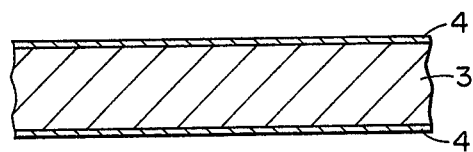
FIG. 7 is a cross sectional view of a laminate suitable for the frame of seat according to the present invention.

FIG. 7 is a cross section of an embodiment of a laminate used in the present invention which has an inner layer sandwiched between two outer layers.

Figure 8:
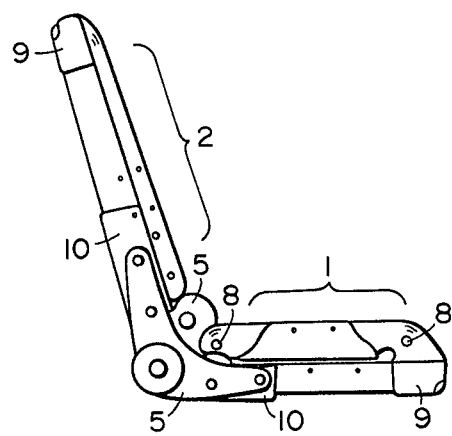
FIG. 8 is an oblique view of the frame of the present invention.

Referring to FIG. 8, the seat has a backrest portion 2 and a seat portion 1. Holes 8 are formed before drawing working and the positions of hole 8 are those at which deformation occurs upon drawing working. Therefore, the holes facilitates deep drawing. At the outer end corners of the backrest portion and the seat portion, there are provided metal reinforcing members 9, 9 and at portions where a tilting angle controlling device 5 is fixed, there are provided metal reinforcing members 10, 10.

The seat according to the present invention is light as well as strong since the frame is fabricated by using the particular laminate, and the frame can be easily shaped by cold working.

I claim:

1. A seat frame formed from a laminate comprising an inner non-metallic material and two metal foil layers, said frame comprising a unitary structure including raised peripheral ribs forming two side walls and two end walls all of which are continuous, at least three of said walls being separately reinforced by respective reinforcing members each formed by inner extensions of the respective walls folded back and held to the wall from which it extends.

2. A seat according to claim 1 in which the non-metallic material is a thermoplastic resin and the metal foil is aluminum.

3. A seat according to claim 1 in which the non-metallic material is a thermoplastic resin and the metal foil is iron.

4. A seat according to claim 2 or 3 in which the thermoplastic resin is polyethylene.

5. A seat according to claim 2 or 3 in which the thermoplastic resin is polypropylene.

6. A seat according to claim 2 or 3 in which the thermoplastic resin is polyamide.

7. A seat frame as in claim 1 wherein all of said walls are separately reinforced by said reinforcing members.

* * * * *